June 3, 1941.     H. HEINRICH ET AL     2,244,296
SERVOMOTOR
Filed July 1, 1938     2 Sheets-Sheet 1

Inventors
Hans Heinrich
Willy Voit
Max Hurst
by Roy F. Steward
their attorney

June 3, 1941.  H. HEINRICH ET AL  2,244,296
SERVOMOTOR
Filed July 1, 1938   2 Sheets-Sheet 2
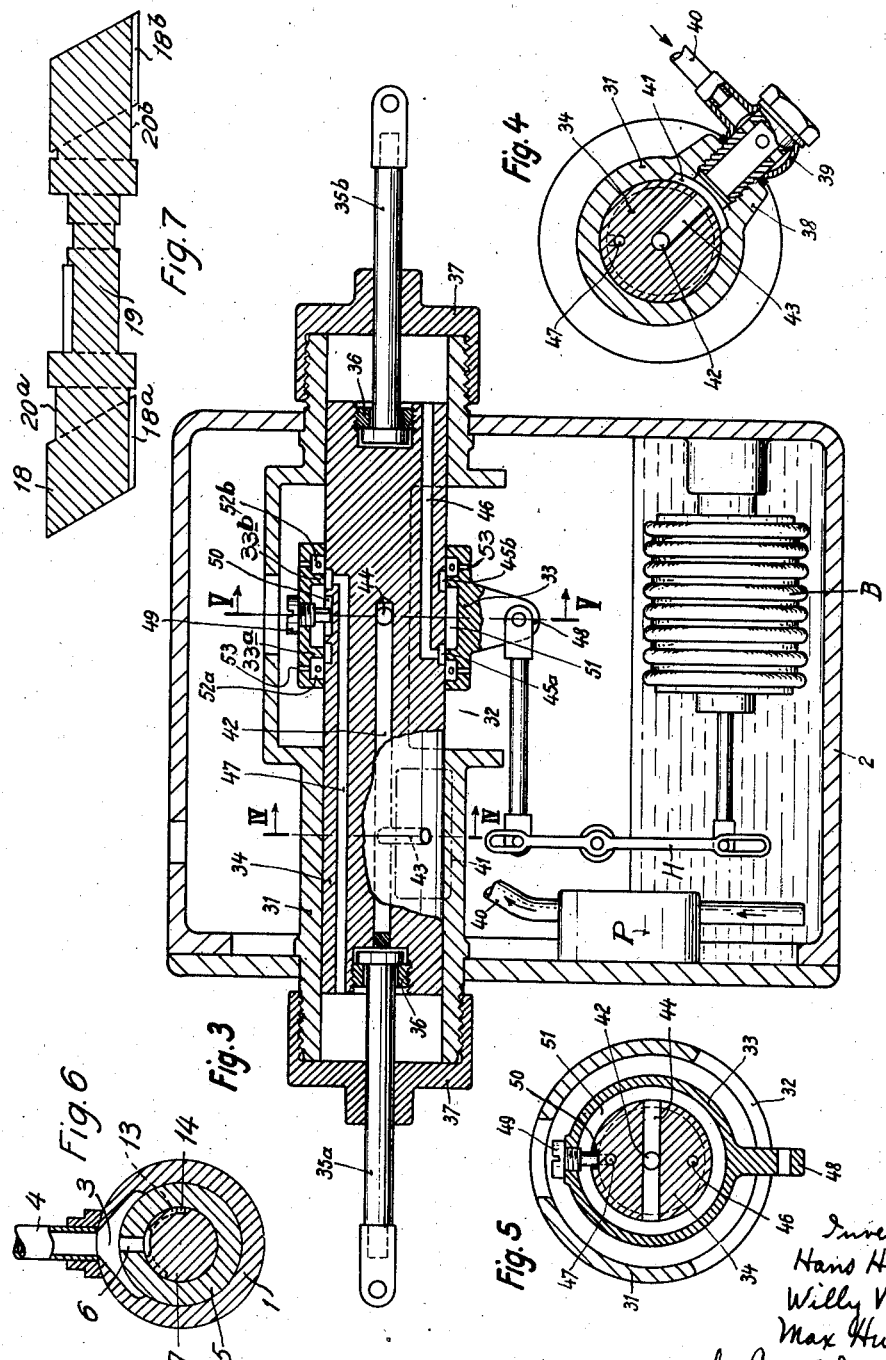
Inventors
Hans Heinrich
Willy Voit
Max Hurst
by Roy F. Steward
their attorney Patented June 3, 1941

2,244,296

UNITED STATES PATENT OFFICE 2,244,296

SERVOMOTOR

Hans Heinrich, Stuttgart, Willy Voit, Stuttgart-Bad Cannstatt, and Max Hurst, Stuttgart, Germany, assignors to Robert Bosch Gesellschaft mit beschränkter Haftung, Stuttgart, Germany Application July 1, 1938, Serial No. 217,078
In Germany July 22, 1937

11 Claims. (Cl. 121—41)

The present invention relates to piston servo-motors of the type which serve to strengthen the adjusting forces produced by a governor, and in which the inflow of the working fluid which moves the piston to and fro, to one or other of the work chambers of the piston is controlled by pairs of control edges in dependence on the movements of an adjusting member actuated by the governor and of the piston.

In servomotors of this kind, it is possible to achieve a simple and appropriate construction and a good sealing of the chambers serving for the precise control and for the exact operation of the working fluid by the fact that the working surfaces of the piston and the control edges belong to one and the same cylindrical surface.

The invention is more particularly described with references to the accompanying drawings, in which:

Figure 3 shows a further form of construction in longitudinal section.

Figure 4 is a cross section on the line IV—IV in Figure 3.

Figure 5 is a cross section on the line V—V in Figure 3.

Figure 6 is a cross-section on the line VI—VI in Figure 1.

Figure 7 is a longitudinal cross-section of the piston 18 of Figure 2.

Figure 1:
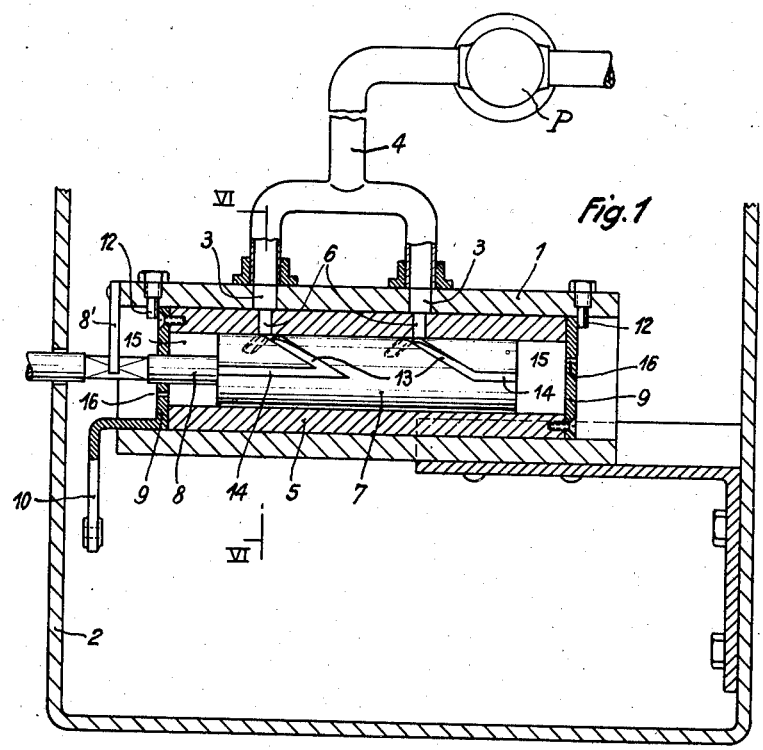
Figure 1 shows one form of construction in longitudinal section.

In the first example of construction according to Figure 1, a cylindrical casing 1, which is provided with an axial bore, is secured by means of a bracket to the wall of a fluid container 2. To two cross slots 3 provided in the wall of the casing 1 are connected the two branches of a bifurcated pipe 4, to which a pump, indicated diagrammatically at P, forces a fluid, such as oil, from the container 2. A tightly fitted bush 5 is pushed into the axial bore of the casing 1. Two bores 6 provided in the wall of the bush are opposite to the two slots 3 provided in the casing. In the axial bore of the bush 5 is fitted a piston 7, which is shorter than the bush and is connected through a rod 8 with a control member (not shown) e. g., with the control rod of an injection pump. The rod 8 is flattened for a part of its length. A part 8' secured to the left hand end of the casing grips round the flattened part in the manner of a key, so that the piston together with the rod can be longitudinally displaced, but cannot be turned towards the casing.

The axial bores of the bush are tightly closed by two covers 9. On the cover which is pushed over the rod 8 connecting the piston with the control member, there is fitted an arm 10, which is pivotally connected with a governor (not shown) and through which the bush can be turned by the governor. The bush 5 is protected against longitudinal displacement by stops 12. In the skirt of the piston 7 are provided two grooves 13 which run obliquely to the longitudinal axis but are parallel to each other, and which are connected through longitudinal grooves 14 to the chambers 15 located between the ends of the piston and the covers. The axial spacing of the two oblique grooves 13 is somewhat smaller than the axial spacing of the bores 6. In the covers 9 are disposed throttle bores 16 for the efflux of the working fluid from the two work chambers 15.

In the middle position shown of the piston 7 both ends of the pipe 4 are connected through the cross slots 3, bores 6 and grooves 13, 14 with the two work chambers 15. In this position of the parts relative to each other, however, the bores 6 only leave open quite small passage cross section towards the grooves 13. Now if the arm 10 is rocked rearwards, viewed from the plan of the drawing, by the governor and thus the bush 5 is turned, then firstly the position of the control openings 6 relative to the oblique control grooves 13 is altered in such a way that the inflow to the oblique groove located on the left in Figure 1 is diminished, while the inflow of the groove located at the right is increased, so that now more working fluid enters the right hand work space 15 of the piston. The piston is thereby displaced to the left. If the rotary movement of the bush which has been commenced is not continued, then by this movement of the piston the cross section for the passage of the fluid on the right hand side immediately becomes smaller again. The fluid displaced on the displacements of the piston escapes through the throttle bore 16, whereby the movement of the piston is damped.

Figure 2:
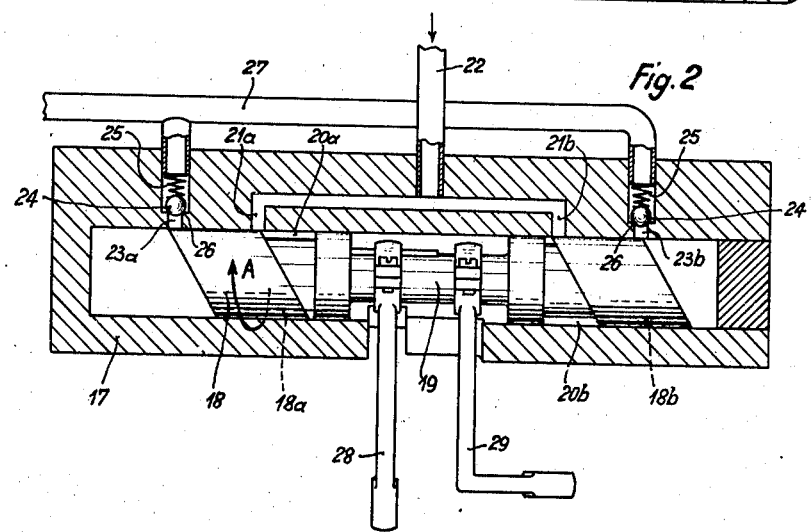
Figure 2 shows another form of construction in longitudinal section.

In the example according to Figure 2, there is pushed into the axial bore of a casing 17 a tightly fitting piston 18, whereupon the bore is sealed at the end where insertion is effected. The piston is shorter than the axial bore and is cut off obliquely at both ends. The oblique end surfaces are parallel to each other. The middle part of the piston is reduced to a thin shaft 19, and in the skirt of each of the two heads of the piston is provided an annular groove 20a and 20b, of which the bounding surfaces facing the oblique end surfaces of the piston are directed parallel to the end surfaces, so that the skirt of each of the two heads of the piston is bounded by two parallel oblique surfaces. The two annular grooves 20a and 20b are connected to the two work chambers by longitudinal grooves 18a and 18b, which are provided in the skirt of the two heads of the pistons.

In the wall of the casing there are provided in a longitudinal plane four radial bores, the two inner bores 21a and 21b of which are connected together to a pipe 22 for feeding the fluid which is under pressure. The inner and outer bores 21a and 21b and 23a and 23b, respectively open at the inner wall of the casing bore, the spacing of the inner bores 21a and 21b from the outer bores 23a and 23b being somewhat smaller than the spacing of the two oblique edges provided on each of the two heads of the piston. The bores 23a and 23b are widened towards the exterior. In each widened bore is provided a ball valve 24, the ball of which is pressed by a spring 25 on to the seat 26. The two bores 23a and 23b are connected by a pipe 27, which conveys away the fluid emerging from the work chambers.

Through a recess provided in the middle of the casing 17 two levers 28 and 29, which engage on the shaft 19 of the piston, project out of the casing. The piston shaft 19 can be displaced but not turned relative to the lever 28, which can be rocked by a governor (not shown).

One end of the other lever 29 is connected to the piston shaft so that relative longitudinal movement of these parts is prevented and relative rotary movement is permitted, the free end of this lever being bent or arranged at an angle and connected with a part not shown, such as the control rod of an injection pump.

When the piston 18 occupies the position shown in Figure 2, the left hand control edge of the right hand head of the piston covers the mouth of the bore 21b, so that no pressure fluid can flow on to the right hand side of the piston, while the control edge at the right hand end of the piston leaves a small part of the outlet cross section of the bore 23b open. Matters are reversed on the left hand piston side, and there the oblique bounding edge of the annular groove 20a leaves the mouth of the bore 21a open a little, while the outlet bore 23a is completely covered. In the position shown of the piston, fluid will enter the left hand work chamber by way of 20ª, 18ª and shift the piston towards the right hand side, thereby expelling fluid from the right hand work chamber through 23b into the outlet pipe 27. If the piston is rotated in the direction of the arrow A, pressure fluid can flow out of the bore 21b into the annular groove 20b, and from the latter through the longitudinal groove 18b to the right hand work chamber, so that the piston is pushed to the left and in so moving takes with it the lever 29.

On the aforesaid rotary movement of the piston, the inflow from the inlet bore 21a is, moreover, interrupted on the left hand side of the piston, but the outlet bore 23a is opened; at the same time, the outlet bore 23b is closed on the right hand side with the opening of the inlet bore 21b. On the left hand side of the piston the working fluid which the piston displaces on its displacement to the left, which now commences can now escape, until the left hand control edge on the left hand piston head has slipped over the outlet 23a and thus closed it. The arrangement of the servomotor according to Figure 2 has the advantage that large passage cross sections for the control fluid are opened and closed on a small turning of the piston, so that sensitive governing is obtained.

In the example in Figures 3 to 5, a casing 31, which narrows at both ends and is provided with axial bores of equal size, is accommodated in a container 2. In its central part 32, the casing is so recessed that an annular slide valve 33, which is pushed over the piston 34, can be pushed to and fro from the outside in the recess 32. The piston 34 is bindingly fitted both in the slide valve 33 and in the casing. In each of the two end surfaces of the piston, there is provided a short threaded bore in which the thickened end of rods 35a and 35b are inserted, which are each so coupled with the piston by means of a nipple 36, which is pushed over the body of the shaft and screwed into the threaded bore, that they are caused to follow the longitudinal movements of the piston, but when this is done, divergences between the longitudinal axes of the piston and of the rods can be balanced. The rods project out of the casing through bores in the covers 37. The rod 35b is connected to a governing rod (not shown) of an injection pump, and the rod 35a is connected to an ignition adjuster (also not shown).

As Figure 4 shows, there is disposed on the right hand side of the surface of the casing a boss 38, which is provided with an internal thread and into which is secured a connecting member 39 for the feed pipe 40 of a fluid under pressure supplied by any suitable means, as for example, pump P. In the inner wall of the casing adjacent to the boss 38 there is provided a wide longitudinal groove 41. In the left hand part of the piston shown in Figure 3 is provided a longitudinal bore 42, to which is connected a cross bore 43 which opens at that part of the skirt of the piston which is opposite to the longitudinal groove 41 (Figure 4). To the longitudinal bore 42 of the piston is connected a second cross bore 44, which opens at that part of the skirt of the piston which is covered by the annular slide valve 33 (Figure 5). Two parallel annular grooves 45a and 45b are cut in the working surface of the piston. The left hand annular groove 45a is connected through a short tap bore with a longitudinal bore 46 provided in the piston, which tap bore opens at the right hand end of the piston, and the right hand annular groove 45b is connected through a tap bore with a longitudinal bore 47 in the piston, which longitudinal bore opens in the left hand face of the piston.

To the annular slide valve 33 is fitted a boss 48 which projects out of the thickened casing part through the opening 32 and on which engage levers H which are adjusted by means of a governor capsule B accommodated in the container 2. The annular slide valve is guided on the piston by a pin 49, which is screwed into the wall of the slide valve and projects into a longitudinal groove 50 provided on the surface of the piston (Fig. 5).

The guide face of the annular slide valve is broken by a wide annular groove 51 and two narrow annular grooves 52a and 52b, so that between the grooves there remain two bars 33a and 33b, each of which is somewhat narrower than each of the annular grooves 45a and 45b. The annular groove 51 is somewhat wider than that portion of the skirt of the piston which is located between the grooves 45a and 45b.

In the wall of the annular slide valve are provided a number of radial tap bores 53, which connect the narrow annular grooves 52a and 52b with the casing chamber in which the annular slide valve moves.

In the middle position of the piston shown in Figure 3, the narrow bars 33a and 33b of the annular slide valve project beyond the annular grooves 45a and 45b of the piston in such a way that on both sides of the bars small gaps are open for the passage of the pressure fluid, which is pressed from the pipe 40 and the connecting member 39 through the bores 43, 42 and 44 to the annular groove 51 of the slide valve. In the position of the piston and of the slide valve as shown, the fluid delivered can flow away out of the annular groove 51 around the bars of the annular grooves 52a and 52b and through the tap bores 53 into the container 2. Now if the slide valve is pushed to the left by the governor B and the rods H, then the connection between the annular groove 45b in the piston and the annular groove 51 in the slide valve is interrupted. Furthermore, when this occurs, the connection between the annular groove 45a in the piston and the annular groove 52a in the slide valve is also terminated, so that the working fluid delivered passes through the annular grooves 51, 45a and the bore 46 into the right hand work chamber of the servomotor and causes a rise of pressure in this chamber and a displacement of the piston to the left. The fluid forced out of the left hand work chamber by the piston on its displacement to the left can flow away through the bore 47, the piston grooves 45b, the slide valve groove 52b, and the bores 53. If the annular slide valve is not displaced further to the left, then the movement of the piston following the slide valve is terminated with the balance of the pressure in the two work chambers, and equilibrium is again present.

In the arrangement of the servomotor according to Figures 3 to 5, the piston thus follows the adjusting movements of the annular slide valve in the same direction. In doing this, the piston takes exactly the same path which the annular slide valve also carries out under the influence of the governor, and adjusts the control rod or the ignition adjuster through the rods 35a and 35b.

We declare that what we claim is:

1. A piston servomotor comprising in combination a piston, a cylinder enclosing said piston to provide a piston guiding surface and to form a pair of work chambers situated at opposite ends of the said cylinder, whereby the inflow of a working fluid to one of the said work chambers moves the piston in a direction away from that chamber and means for causing the said fluid to flow into one or other of the said work chambers, said means including passages in said piston for the supply and removal of working fluid to and from said chambers, a pair of control edges which belong to one and the same cylindrical surface as the working surface of the aforesaid piston, and an adjusting member comprising an annular slide valve slidably mounted on said piston and provided with counter-control edges cooperating with said other control edges to control said passages, the piston guiding portions of said cylinder and said slide valve having the same interior diameter.

2. A piston servomotor comprising in combination a piston, a cylinder enclosing said piston to provide a piston guiding surface and to form a pair of work chambers situated at opposite ends of the said cylinder, whereby the inflow of a working fluid to one of the said work chambers moves the piston in a direction away from that chamber, and means for causing the said fluid to flow into one or other of the said work chambers, said means including passages in said piston for the supply and removal of working fluid to and from said chambers, a pair of control edges which belong to one and the same cylindrical surface as the working surface of the aforesaid piston, and an adjusting member comprising an annular slide valve longitudinally displaceable along said piston and provided with counter control edges cooperating with said other control edges to control said passages, said slide valve being provided with a recess between said counter control edges and open to said piston working surface, said recess being arranged to be connected to one or the other of said passages by displacement of said slide valve, and means for supplying working fluid under pressure to said recess.

3. A piston servomotor comprising in combination a piston, a cylinder enclosing said piston to provide a piston guiding surface and to form a pair of work chambers situated at opposite ends of the said cylinder, whereby the inflow of a working fluid to one of the said work chambers moves the piston in a direction away from that chamber, and means for causing the said fluid to flow into one or other of the said work chambers, said means including passages in said piston for the supply and removal of working fluid to and from said chambers, a pair of control edges which belong to one and the same cylinder surface as the working surface of the aforesaid piston, and an adjusting member comprising an annular slide valve longitudinally displaceable along said piston and provided with counter control edges cooperating with said other control edges to control said passages, said slide valve being provided with a recess between said counter control edges and open to said piston working surface, said recess being arranged to be connected to one or the other of said passages by displacement of said slide valve, and means for supplying working fluid under pressure to said recess, said slide valve also being provided with recesses opening into a region of relatively low pressure and also open to the working surface of said piston, one of said last-mentioned recesses being arranged to be connected to one of said passages by displacement of said slide valve when the other passage is connected to said first-mentioned recess.

4. A piston servomotor comprising in combination a piston, a cylinder enclosing said piston to provide a piston guiding surface and to form a pair of work chambers situated at opposite ends of the said cylinder, whereby the inflow of a working fluid to one of the said work chambers moves the piston in a direction away from that chamber, and means for causing the said fluid to flow into one or other of the said work chambers, said means including passages in said piston for the supply and removal of working fluid to and from said chambers, a pair of control edges which belong to one and the same cylindrical surface as the working surface of the aforesaid piston, and an adjusting member comprising an annular slide valve mounted upon and longitudinally displaceable along said piston, said slide valve being operable in a recessed portion of said piston guiding surface and provided with counter control edges cooperating with said other control edges to control said passages, said slide valve being provided with an annular groove whose boundary walls terminate in said counter control edges and which groove opens upon the piston working surface, said groove being connected to one or the other of said passages by movement of said slide valve, and conduit means carried by said piston for supplying said groove with working fluid under pressure.

5. A piston servomotor according to claim 2, in which the recess is formed as a central annular groove in the sliding surface of the aforesaid annular slide valve to admit working fluid under pressure to the said chambers, and a pair of outer grooves similarly is formed in said slide valve, said outer grooves opening into a region of relatively low pressure and serving to release fluid under pressure from the chambers, by longitudinal displacement of said slide valve in such a manner that the control surfaces of the said annular slide valve, which are present between the aforesaid three annular grooves, only partially cover the said passages in connection with the said work chambers when the said annular slide valve is located in a middle position.

6. A piston servomotor according to claim 2, wherein the means for supplying the said working fluid to the recess in the sliding surface of the aforesaid annular valve consists in suitable conduits located within the said piston.

7. A piston servomotor according to claim 2, in which the recess comprises a central annular groove formed in the sliding surface of the aforesaid annular slide valve to admit working fluid under pressure to the said chambers, a pair of outer grooves similarly formed being provided in said slide valve and serving to release fluid under pressure from the chambers in such a manner that the control surfaces of the said annular slide valve, which are present between the aforesaid three annular grooves, only partially cover the said passages in connection with the said work chambers when the said annular slide valve is located in a middle position, and conduits being provided between the said outer grooves and the skirt of the aforesaid annular slide valve whereby working fluid may flow away from said valve after release from said work chambers.

8. A piston servomotor comprising in combination a double acting piston, a cylinder, two working chambers in said cylinder at opposite ends of said double acting piston, means displaceable relative to a part of the peripheral surface of said piston, lying between the piston ends, two recesses on the peripheral face of said piston, channels in said piston, one of said channels connecting said one recess with one of said working chambers and another channel connecting said other recess with said other working chamber, a fluid supply source, at least one fluid supply channel in said relatively displaceable means, said supply channel being connected with said fluid supply source and ending on said peripheral face of the piston, control means for relatively adjusting said relatively displaceable means from positions, in which said supply channel and said recesses are symmetrical to each other, into unsymmetrical positions in which the free cross-section from said supply channel to the one of said recesses becomes larger than to the other recess whereby the pressure in the one working chamber which is connected by said larger cross-section with said supply channel increases, and an outlet, for each working chamber connected to a region of relatively low pressure, and arranged to be connected to the working chamber being exhausted, the peripheral sliding face of the piston being of the same diameter within the cylinder and within the displaceable means.

9. A piston servomotor as set out in claim 8, in which the recesses are formed as helical grooves and the displaceable means forms part of the cylinder and is adjustable by rotating the piston relatively to the cylinder.

10. A piston servomotor as set out in claim 8 in which the recesses are formed as helical grooves and the displaceable means forms part of the cylinder and is adjustable by rotating the piston relatively to the cylinder, and in which the control means is connected with one end of a lever, the other end of which lever is slidably guided axially upon the piston, and another means, to be controlled by said piston, is secured to the piston against longitudinal movement relative to said piston.

11. A piston servomotor as set out in claim 8, in which the displaceable member connected with the control means is formed as a slide circumferentially surrounding the intermediate part of the piston, said supply channel being formed as a groove in said displaceable means which is in connection with the fluid supply source and ends on the cylindrical piston face between the recesses, each having a square bore, the channels in said piston being formed as longitudinal bores, each beginning in one of said square bores of the piston and ending in that working chamber which is next to the other square bore, circumferential bars carried by said displaceable member and limiting the length of said groove and being, in the non-working position, located opposite to said recesses, additional grooves in said displaceable member at both sides adjacent to said bars, one of said additional grooves coming in connection with the adjacent recess when at adjusting the displaceable member the middle groove communicates with the other recess, said outlets connecting the additional grooves with the region of relatively low pressure, said outlets having a restricted cross-section and the displaceable means having a bore of the same diameter as the cylinder so that the piston slides with the same peripheral face in the displaceable means as well as in the cylinder.

HANS HEINRICH.
WILLY VOIT.
MAX HURST.